United States Patent Office 3,679,551
Patented July 25, 1972

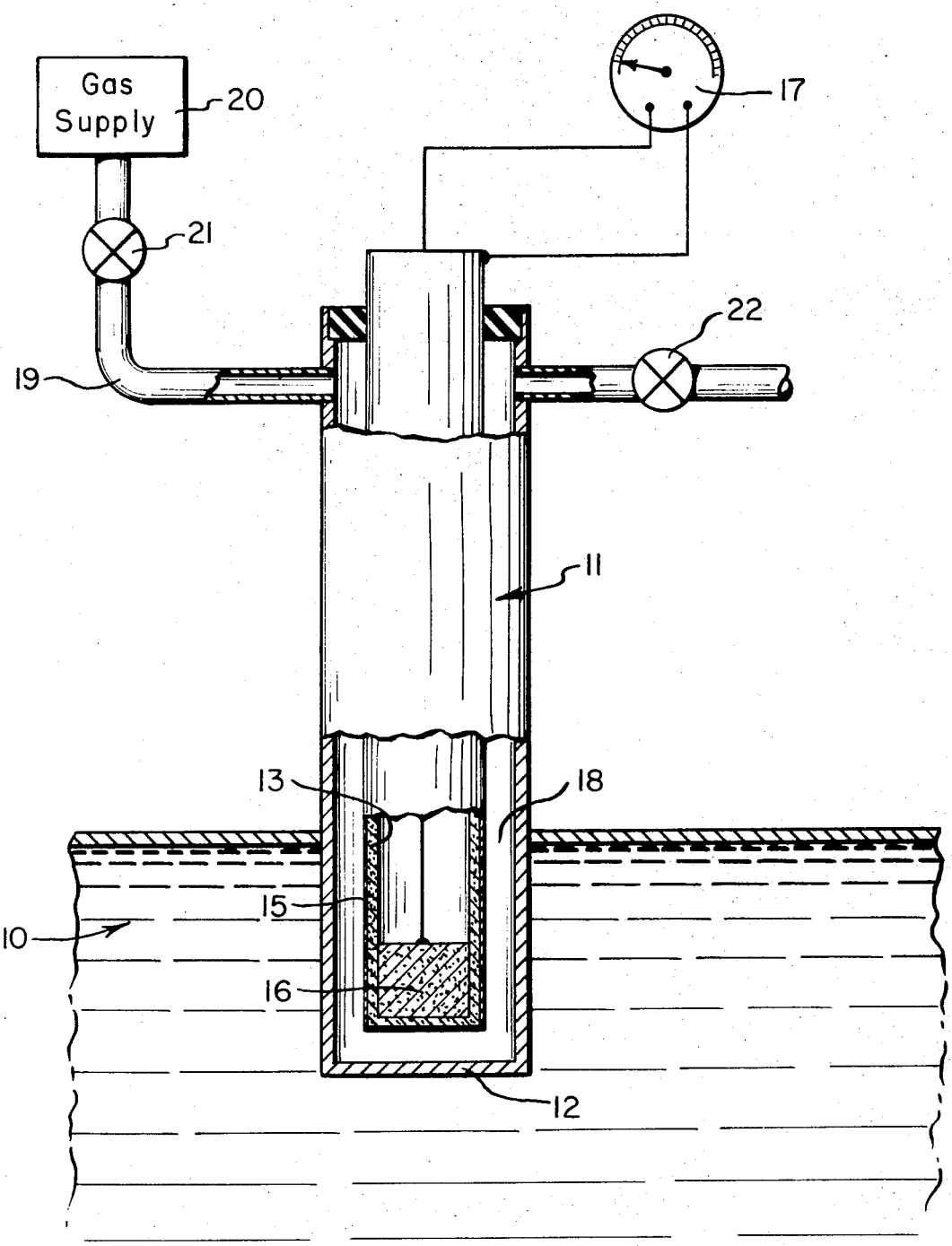

3,679,551
METHOD AND APPARATUS FOR DETERMINING THE CARBON ACTIVITY OF FLUIDS
Morris Kolodney, River Edge, N.J., assignor to the United States of America as represented by the United States Atomic Energy Commission
Filed Oct. 30, 1968, Ser. No. 771,953
Int. Cl. G01n 27/46
U.S. Cl. 204—1 T                    17 Claims

ABSTRACT OF THE DISCLOSURE

The carbon activity of a fluid of unknown carbon content is determined by measuring the E.M.F. of a dependent electrochemical relationship. The carbon-containing fluid is brought into contact with a tubular probe made of a fluid-impervious material (e.g., Fe or Ni) in which carbon from the fluid dissolves and diffuses. A ceramic tube is disposed within and is spaced slightly away from the outer tubular probe. The annular space between the outer tubular probe and the ceramic tube is filled with a gaseous medium containing $CO_2$, CO and a small amount of $O_2$, the relative proportions of these gases present in the gaseous medium being determined by well known, reversible chemical reactions. The ceramic tube is made of a metallic oxide material (e.g., $ZrO_2+CaO$) that conducts electricity by the transfer of oxygen ions through the material. A thin porous layer of an inert metal (e.g., Pt) is disposed on the outer surface of the ceramic tube in contact with the gaseous medium, and a reference electrode of known oxygen activity (e.g., $Cu+Cu_2O$) is disposed on the inside of the tube in contact with the inner surface thereof. A potentiometer in electrical contact with the layer of inert metal and with the reference electrode measures the potential difference (E.M.F.) between the gaseous medium and the reference electrode, and this E.M.F. provides a direct measure of the carbon activity of the carbon-containing fluid.

BACKGROUND OF THE INVENTION (1) Field of the invention

This invention relates to methods and apparatus for measuring the carbon activity of carbon-containing fluids of unknown carbon content.

(2) Description of the prior art

Accurate determination of the carbon content, or carbon activity, of carbon-containing materials is frequently of great importance. For example, the carbon content of the molten metals (for example, molten sodium) employed as coolants and heat transfer mediums in nuclear reactors must be kept to a minimum in order to prevent embrittlement of steel piping and other metal equipment with which the molten metal comes into contact. In other cases it may be necessary to determine more or less continuously the carbon content of gases, such as furnace gases, to maintain desired control of process conditions or furnace operation. Accordingly, the carbon content of these carbon-containing fluids must be determined continuously, or at frequent intervals, to prevent the carbon content of the liquid metal from increasing above, or decreasing below, pre-determined levels.

A number of procedures have heretofore been employed to determine more or less continuosuly the carbon content of carbon-containing fluids. One such procedure involves chemical analysis of samples of the fluid withdrawn periodically from the main body of fluid. However, chemical analysis is time consuming and cumbersome, and in many instances does not lend itself to continuous monitoring of process streams. Another procedure for measuring the carbon content of fluids takes advantage of the fact that carbon will dissolve in iron or nickel that is exposed to the carbon-containing fluid. Changes in properties of an iron or nickel probe in contact with the fluid, or changes in the composition of a second fluid also in contact with the probe, provide a measure of the carbon content of the carbon-containing fluid medium being monitored. However, such prior art procedures for measuring the carbon content of fluids involve a flow of carbon out of the fluid being monitored, and as a result the measurement may be in error because the carbon content of the fluid in the vicinity of the probe is diminished in the act of measurement.

SUMMARY OF THE INVENTION

I have now devised an improved method and apparatus for determining the carbon activity, or carbon content, of a carbon-containing fluid which does not consume carbon or withdraw carbon from the carbon-containing fluid in the act of measurement of the carbon activity of the fluid. My improved carbon activity measuring device comprises an outer tubular probe having a closed bottom that is adapted to contact a carbon-containing fluid of unknown carbon activity. The tubular probe is formed from materials that are impervious and inert with respect to the carbon-containing fluid, at least a portion of the probe being formed from an impervious material in which elemental carbon will dissolve and diffuse at the operating temperature of the device. An inner ceramic tube having a closed bottom is disposed essentially concentrically within and is spaced a small distance from the inner surface of the outer tubular probe. The inner ceramic tube is formed from a metallic oxide material that is impervious to gas and that has a crystal structure containing oxygen ion vacancies such that the metallic oxide material conducts electricity predominantly by the migration of oxygen ions through the material. The annular space between the inner surface of the outer tubular probe and the outer surface of the inner ceramic tube is filled with a gaseous medium containing a mixture of carbon monoxide and carbon dioxide, and a porous layer of an inert material such as platinum or the like is disposed on the outer surface of the ceramic tube in contact with said gaseous medium. A reference electrode is disposed in intimate physical contact with the inner surface of the closed bottom of the ceramic tube, the reference electrode comprising an oxygen-containing material that is physically and chemically stable at the operating temperature of the device and free energy of formation of the oxidic constitutent of which is known. Potentiometer means are electrically connected to the reference electrode and to the porous metal layer on the outer surface of the ceramic tube for measuring the difference in electrical potential that exists between said reference electrode and the gaseous medium in contact with said porous metal layer.

When the carbon-containing fluid medium of unknown carbon activity is brought into contact with the outer surface of the tubular probe, carbon from the fluid medium will dissolve and diffuse in the fluid-impervious tubular probe until the carbon content of the material from which the probe is made is in equilibrium with the carbon content of the fluid medium. Carbon at the inner surface of the tubular probe reacts with carbon dioxide contained in the gaseous medium in contact therewith in accordance with the following reversible reaction:

$$C+CO_2 \rightleftharpoons 2CO$$

Equilibrium conditions are quickly established whereby the relative amounts of carbon monoxide and carbon dioxide in the gaseous medium are stabilized at levels reflecting the carbon activity or carbon content of the carbon-containing fluid. The gaseous medium also contains a small but measurable amount of oxygen as a result of the dissociation of carbon dioxide in accordance with the following reversible reaction:

$$2CO_2 \rightleftharpoons 2CO + O_2$$

Again, equilibrium conditions are quickly established whereby the relative amounts of oxygen, carbon dioxide and carbon monoxide present in the gaseous medium are stabilized at levels also reflecting the carbon activity of the fluid being monitored.

The inner ceramic tube in contact with the gaseous medium serves as a solid electrolyte for a galvanic cell one electrode of which is the oxygen-containing gaseous medium and the other electrode of which is an oxidic reference electrode the free energy of formation of the oxidic constituent of which is known. As the ceramic tube is formed from a metallic oxide material that conducts electricity predominantly by the migration of oxygen ions through the material, the difference between the oxygen activity of the gaseous medium and the oxygen activity of the reference electrode can be measured by means of a high impedance potentiometer. The potential difference between the gaseous medium and the reference electrode is, therefore, related to the oxygen content of the gaseous medium. However, the oxygen content of the gaseous medium is related to the ratio of carbon dioxide and carbon monoxide in the gaseous medium, and the $CO_2$ to CO ratio is related to the carbon activity of the carbon-containing fluid medium. Therefore, the voltage or potential difference is uniquely related to, and is a direct measure of, the carbon activity of the fluid being monitored.

BRIEF DESCRIPTION OF THE DRAWINGS

The carbon activity measurement means of my invention will be better understood from the following detailed description thereof in conjunction with the single figure of the accompanying drawing which shows schematically an advantageous embodiment of my new carbon activity meter.

DETAILED DESCRIPTION

The electrochemical carbon meter of my invention is adapted to measure the carbon activity of a carbon-containing fluid 10 of unknown carbon content. As shown in the single figure of the drawing, the major components of my new device comprise an outer tubular probe 11 having a closed bottom 12 adapted to contact the fluid 10 of unknown carbon content, an inner ceramic tube 13 disposed concentrically within the outer tubular probe 11, the tube 13 having a thin porous layer 15 of an inert metal deposited on the outer surface thereof, a reference electrode 16 in contact with the inner surface of the ceramic tube 13, and potentiometer means 17 in electrical contact with the reference electrode 16 and the metal layer 15 on the outer surface of the ceramic tube 13. The inner surface of the outer tubular probe 11 and the outer surface of the ceramic tube 13 define an annular space 18 that is filled with a gaseous medium containing a mixture of carbon dioxide and carbon monoxide. Moreover, the annular space 18 is advantageously connected by means of a conduit 19 to a source 20 of a gaseous medium of known carbon dioxide and carbon monoxide content, the conduit 19 being provided with a control valve 21 as shown.

The outer tubular probe 11 is formed from a material that is impervious with respect to the fluid 10 and that will not react with this fluid in the operating temperature of the device. In addition, at least a portion of the bottom of the tubular problem 11 is formed from a material in which carbon from the fluid 10 will dissolve and diffuse when the probe is brought into contact with the fluid 10 as shown in the drawing. Materials which meet these requirements include, but are not limited to, iron, nickel and iron-nickel alloys.

The ceramic tube 13 is formed from a metallic oxide metal that has a crystal structure containing oxygen ion vacancies such that the material conducts electricity predominantly by the migration or transfer of oxygen ions through the crystalline structure of the material. Metallic oxide materials which possess the required electrical properties include, but are not limited to, solid solutions of such solvent metal oxides as thoria ($ThO_2$), zirconia ($ZrO_2$), hafnia ($HfO_2$) and ceria ($CeO_2$) the crystal lattice of which solvent metal oxide contains from about 2 to 20% by weight, and preferably from about 2 to 15% by weight, of a solute metal oxide the metallic constituent of which oxide has a valence of less than 4. Solute metal oxides which have been successfully employed for this purpose include, but are not limited to, calcia (CaO), strontia (SrO), yttria ($Y_2O_{33}$), lanthana ($La_2O_3$) and rare earth metal oxides the metallic constituent of which has a valence of less than 4. The metallic oxide material is formed by conventional ceramic processes into an elongated tube 13 having a dense, rigid and relatively strong ceramic structure that is impervious to gases at the operating temperature of the device. The tube 13 may be a cylindrical structure having a flat bottom as shown in the drawing, or it may have various other configurations suitable for its intended use. As previously noted, the outer surface of the ceramic tube 13 is provided with a thin layer 15 of an inert metal such as gold or platinum, the metal layer 15 being sufficiently porous to allow the gaseous medium contained in the annular space 18 to contact the outer surface of the ceramic tube 13.

The reference electrode 16 is formed from an oxygen-containing material that is physically and chemically stable at the operating temperature of the device and for which the free energy of formation of the oxidic constituent thereof is known. Oxygen-containing materials from which the reference electrode may be formed advantageously are intimate mixtures of a metal and its oxide or are oxygen-bearing gases of known oxygen potential. Metal and metal oxide mixtures of known oxygen potential which may be used as the reference electrode include, but are not limited to, copper and cuprous oxide, nickel and nickel oxide, iron and iron oxide, and cobalt and cobalt oxide. Oxygen-bearing gases of known oxygen potential which may be used as the reference electrode include, but are not limited to, mixtures of carbon monoxide and carbon dioxide, mixtures of oxygen and an inert gas (for example, nitrogen or argon) and the like. It is essential that the reference electrode 16 be in good electrical contact with the inner surface of the ceramic tube 13 and be capable of maintaining a fixed, known oxygen potential at the inside surface of the tube. Accordingly, in the case of a reference electrode formed from a metal and its oxide, a small quantity of a metal-metal oxide powder mixture is rubbed or burnished on the inside surface of the closed bottom end of the ceramic tube 13, and the remainder of the mixture is then compacted in place at the bottom of the tube. In the case of a reference electrode formed from an oxygen bearing gas, the inner surface of the ceramic tube 13 is provided with a porous layer of an inert metal similar to the porous layer 15 on the outer surface of the tube.

Carbon from the carbon-containing fluid 10 dissolves and diffuses throughout the portion of the outer tubular probe 11 in contact with the fluid 10 until the carbon content of this portion of the probe wall is in equilibrium with the carbon content of the fluid 10. Carbon present in the inner surface of the tubular probe 11 reacts with carbon dioxide present in the gaseous medium in accordance with the following reversible reaction:

(1) $\quad C \text{ (from probe)} + CO_2 \rightleftharpoons 2CO$ in which the ratio of carbon monoxide to carbon dioxide present in the gaseous medium as a result of the foregoing reaction is established by the following relationship:

(2) $$a_c = \frac{1}{K_1}\left(\frac{(P_{CO})_2}{P_{CO_2}}\right)$$

where $a_c$ = activity of carbon in the probe;
$P_{CO}$ = partial pressure of CO;
$P_{CO_2}$ = partial pressure of $CO_2$; and
$K_1$ = equilibrium constant Because the volume of the gaseous medium in the annular space 18 is so small, substantially no change in carbon activity of the probe wall results from reaction (1). In addition to the reaction between carbon dioxide and carbon, carbon dioxide also dissociates into carbon monoxide and oxygen in accordance with the following reversible reaction:

(3) $$2CO_2 \rightleftharpoons 2CO + O_2$$

The relative amount of oxygen (expressed in terms of its partial pressure) formed by the dissociation of carbon dioxide depends upon the partial pressure of carbon dioxide and carbon monoxide in the gaseous medium and is determined by the following relationship:

(4) $$P_{O_2} = K_2 \left(\frac{P_{CO_2}}{P_{CO}}\right)^2$$

where $P_{O_2}$ = partial pressure of oxygen; and
$K_2$ = the equilibrium constant for Equation 3

The gaseous medium containing a small but measureable amount of oxygen resulting from reaction (3), the ceramic tube 13 that conducts electricity by the migration of oxygen ions through the tube wall and the reference electrode 16 of known oxygen potential together comprise a galvanic cell which generates a voltage or potential difference that is directly dependent upon the partial pressure of oxygen in the gaseous medium. That is to say, the difference in electrical potential between the reference electrode of known oxygen potential and the gaseous medium of unknown oxygen potential provides a direct measure of the partial pressure of oxygen in the gaseous medium in accordance with the following relationship:

(5) $$E = K_3 + K_4 \log P_{O_2}$$

where

E = voltage; and
$K_3$ and $K_4$ are constants.

The voltage generated by the difference in oxygen activity or potential is measured by a high impedence potentiometer 17, for example, a high impedence electrometer, that is electrically connected by appropriate leads to the porous metal layer 15 on the outer surface of the ceramic tube 13 and to the reference electrode 16 on the inside of the tube 13. Preferably, the voltage measuring device 17 should limit the current drain to less than about $10^{-8}$ amperes and should be capable of measuring the potential difference with an accuracy of one millivolt.

The voltage measured by the potentiometer 17 is, as previously explained, directly related to the partial pressure of oxygen in the gaseous medium contained in the annular space 18. However, the partial pressure of oxygen depends directly upon the ratio of carbon dioxide to carbon monoxide in the gaseous medium (Equations 3 and 4), and the $CO_2$-CO ratio is related to the carbon activity of the carbon-containing fluid 10 being monitored (Equations 1 and 2). Therefore, the voltage measured by the potentiometer 17 is directly related to the carbon activity of the fluid being monitored, and the meter 17 can be calibrated to read values of carbon activity directly.

The device will operate satisfactorily with a stagnant gaseous medium in the annular space 18. In this case, after the annular space has been flushed out and filled with a gas of the desired initial composition, the control valve 21 and the outlet valve 22 are closed, whereupon the relative amounts of carbon dioxide, carbon monoxide and oxygen present in the gaseous medium are automatically adjusted in accordance with the relationships expressed in Equations 1 through 4 to reflect the carbon activity of the fluid 10 under stable equilibrium conditions. Alternatively, it may be desirable to insure relative constancy of operation, or to avoid undue buildup of oxygen in the gaseous medium, by flowing gas of known $CO_2$ and CO content continuously through the annular space 18 of the device. In this case, the control valve 21 and the outlet valve 22 are adjusted to permit gas from the gas source 20 to flow at a very low rate through the annular space 18, the relative amounts of carbon dioxide, carbon monoxide and oxygen present in the gaseous medium reflecting the carbon activity of the fluid 10 as previously described. In addition, gas from the gas source 20 can be used as the reference electrode in contact with the inner surface of the ceramic tube 13, in which case any difference in the partial pressure of oxygen in the interior of the tube 13 and in the annular space 18 is caused by the carbon activity of the fluid being monitored.

I claim:
1. A device for measuring the carbon activity of a carbon-containing fluid which comprises
   an outer tubular probe having a closed bottom that is adapted to contact a carbon-containing fluid of unknown carbon activity, the tubular probe being formed from materials that are impervious and inert with respect to said fluid with at least a portion of said probe being formed from a material in which elemental carbon will dissolve and diffuse at the operating temperature of the device,
   an inner ceramic tube having a closed bottom, said ceramic tube being disposed essentially concentrically within and being spaced a small distance from the inner surface of the outer tubular probe, the inner tube being formed from a metallic oxide material that is impervious to gas, said metallic oxide having a crystal structure containing oxygen ion vacancies whereby the metallic oxide material conducts electricity predominantly by the migration of oxygen ions through the material, said ceramic tube having a porous layer of an inert metal disposed on the outer surface thereof,
   a gaseous medium containing a mixture of carbon monoxide and carbon dioxide disposed in the space between the inner surface of the tubular probe and the outer surface of the ceramic tube,
   a reference electrode in intimate physical contact with the inner surface of the closed bottom of the ceramic tube, the reference electrode comprising an oxygen-containing material that is physically and chemically stable at the operating temperature of the apparatus and the free energy of formation of the oxidic constituent of which is known, and
   potentiometer means electrically connected to the reference electrode and to the porous metal layer on the outer surface of the ceramic tube for measuring the difference in electrical potential between said reference electrode and the gaseous medium in contact with said porous metal layer.

2. The device according to claim 1 in which the outer tubular probe is formed from a fluid impervious material selected from the group consisting of iron, nickel and iron-nickel alloys.

3. The device according to claim 1 in which the gaseous medium consists essentially of a mixture of carbon monoxide and carbon dioxide.

4. The device according to claim 1 in which the inner ceramic tube is formed from metallic oxide material comprising a solid solution of a solvent metal oxide and from about 2 to 20% by weight of a solute metal oxide, the solvent metal oxide being selected from the group consisting of thoria, zirconia, hafnia and ceria, and the solute metal oxide being an oxide of a metal having a valence of less than four and which is capable of entering the crystal lattice of the solvent metal oxide.

5. The device according to claim 4 in which the solute metal oxide is selected from the group consisting of calcia, strontia, yttria, lanthana and the rare earth metal oxides the metallic constituent of which has a valence of less than four.

6. The device according to claim 1 in which the reference electrode comprises an intimate mixture of a metal and its oxide selected from the group consisting of copper and cuprous oxide, nickel and nickel oxide, iron and iron oxide, and cobalt and cobalt oxide.

7. The device according to claim 1 in which the reference electrode is a gas selected from the group consisting of oxygen, a mixture of carbon dioxide and oxygen, air, and a mixture of oxygen and an inert gas.

8. The device according to claim 1 in which a supply of a gas containing a known concentration of carbon monoxide and carbon dioxide is connected to the annular space between the outer tubular probe and the inner ceramic tube, said gas being adapted to be introduced into and being withdrawn from said annular space at a constant rate.

9. The device according to claim 8 in which the supply of gas is connected to the interior of the ceramic tube, said gas introduced into said ceramic tube serving as the reference electrode of the device.

10. Process for measuring the carbon activity of a carbon-containing fluid which comprises simultaneously:
contacting the carbon-containing fluid medium of unknown carbon activity with one surface of a layer of a material that is impervious to said fluid medium and in which elemental carbon will diffuse at the temperature of the fluid medium;
contacting the opposite surface of said layer of fluid-impervious material with a gaseous medium containing a mixture of carbon monoxide and carbon dioxide;
contacting said gaseous medium with one surface of a layer of ceramic material that is impervious to said gaseous medium and that is formed from a metallic oxide having a crystal structure containing oxygen ion vacancies whereby the metallic oxide material conducts electricity predominantly by the migration of oxygen ions through the material;
contacting the opposite surface of the layer of ceramic material with an oxygen-containing material that is physically and chemically stable at operating temperatures and the free energy of formation of the oxidic constituent of said material is known; and
measuring the difference in electrical potential between the gaseous medium in contact with one surface of the layer of ceramic material and the oxygen-containing material in contact with the other surface of the layer of ceramic material.

11. The process according to claim 10 in which the layer of fluid-impervious material is selected from the group consisting of iron, nickel and iron-nickel alloys.

12. The process according to claim 10 in which the gaseous medium consists essentially of a mixture of carbon monoxide and carbon dioxide.

13. The process according to claim 10 in which the layer of ceramic material comprises a solid solution of a solvent metal oxide and from about 2 to 20% by weight of a solute metal oxide, the solvent metal oxide being selected from the group consisting of thoria, zirconia, hafnia and ceria, and the solute metal oxide being an oxide of a metal having a valence of less than four and which is capable of entering the crystal lattice of the solvent metal oxide.

14. The process according to claim 13 in which the solute metal oxide is selected from the group consisting of calcia, strontia, yttria, lanthana and the rare earth metal oxides the metallic constituent of which has a valence of less than four.

15. The process according to claim 10 in which the oxygen-containing material comprises an intimate mixture of a metal and its oxide selected from the group consisting of copper and cuprous oxide, nickel and nickel oxide, iron and iron oxide, and cobalt and cobalt oxide.

16. The process according to claim 10 in which the oxygen-containing material is a gas selected from the group consisting of oxygen, a mixture of carbon dioxide and oxygen, air, and a mixture of oxygen and an inert gas.

17. The process according to claim 10 in which a supply of a gas containing a known concentration of carbon monoxide and carbon dioxide is connected to the gaseous medium in contact with both the layer of fluid impervious metal and the layer of ceramic material.

References Cited

UNITED STATES PATENTS

| | | | |
|---|---|---|---|
| 3,464,008 | 8/1969 | Meysson et al. | 204—195 |
| 3,468,780 | 9/1969 | Fischer | 204—195 |

OTHER REFERENCES

Kinkkola et al.: "J. of the Electrochemical Soc.," vol. 104, 1957, pp. 379–387.

Wilder: "Trans. of the Metallurgical Soc. of AIME," vol. 236, 1966, pp. 1035–1040.

TA HSUNG TUNG, Primary Examiner

U.S. Cl. X.R.

204—195